US012760194B2

(12) United States Patent
Nakano et al.

(10) Patent No.: US 12,760,194 B2
(45) Date of Patent: Oct. 13, 2026

(54) WATER-BASED INK JET INK COMPOSITION

(71) Applicant: SEIKO EPSON CORPORATION, Tokyo (JP)

(72) Inventors: Tomohito Nakano, Shiojiri (JP); Tomoki Maruyama, Matsumoto (JP); Tetsuro Kozaki, Matsumoto (JP); Manabu Taniguchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 567 days.

(21) Appl. No.: 18/165,372

(22) Filed: Feb. 7, 2023

(65) Prior Publication Data

US 2023/0250306 A1 Aug. 10, 2023

(30) Foreign Application Priority Data

Feb. 8, 2022 (JP) ................................ 2022-017717

(51) Int. Cl.

| | |
|---|---|
| ***C09D 11/38*** | (2014.01) |
| ***C09D 11/322*** | (2014.01) |
| *C08K 5/3415* | (2006.01) |
| *C08K 5/3462* | (2006.01) |

(52) U.S. Cl.

CPC ............ *C09D 11/38* (2013.01); *C09D 11/322* (2013.01); *C08K 5/3415* (2013.01); *C08K 5/3462* (2013.01)

(58) Field of Classification Search

CPC ............................ C09D 11/38; C09D 11/322

See application file for complete search history.

(56) References Cited

U.S. PATENT DOCUMENTS

| | | | | |
|---|---|---|---|---|
| 2008/0171815 | A1* | 7/2008 | Groenendaal .......... | C09D 11/40 524/90 |
| 2012/0165438 | A1* | 6/2012 | Tateishi .............. | C09B 67/0066 524/100 |
| 2015/0361285 | A1* | 12/2015 | Breton ................... | C09D 11/36 347/20 |
| 2018/0127610 | A1* | 5/2018 | Kido .................... | C09D 11/102 |
| 2021/0332254 | A1 | 10/2021 | Yamazaki et al. | |

FOREIGN PATENT DOCUMENTS

| | | | | |
|---|---|---|---|---|
| JP | 2000160072 A | * | 6/2000 | ............ C09D 11/00 |
| JP | 2003-055590 A | | 2/2003 | |
| JP | 2003-176235 A | | 6/2003 | |
| JP | 2019-151714 A | | 9/2019 | |
| JP | 2021-172720 A | | 11/2021 | |

OTHER PUBLICATIONS

English machine translation of JP 2000-160072A. (Year: 2000).*

* cited by examiner

*Primary Examiner* — John E Uselding

(74) *Attorney, Agent, or Firm* — Harness, Dickey & Pierce, P.L.C.

(57) ABSTRACT

A water-based ink jet ink composition contains Pigment Yellow 150, a dispersing resin, and N-hydroxyethylpyrrolidone.

5 Claims, 1 Drawing Sheet

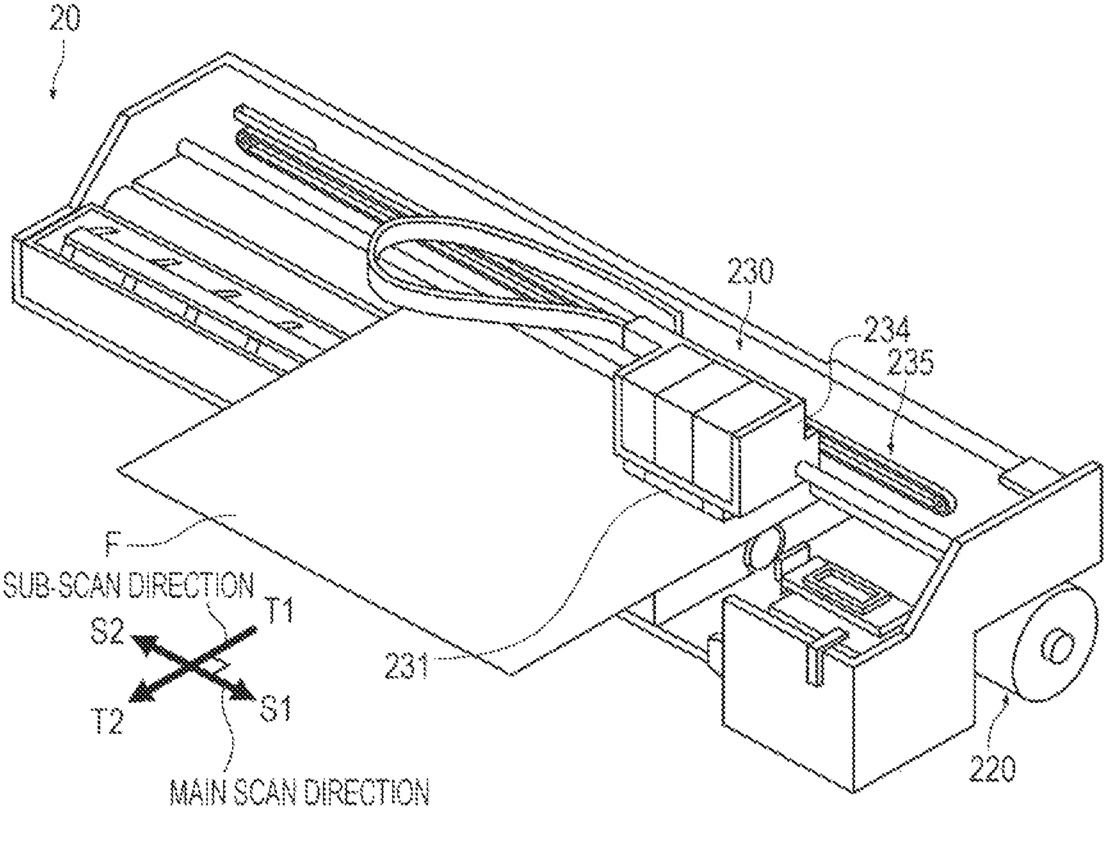
20
230
234
235
F
SUB-SCAN DIRECTION
T1
S2
S1
T2
MAIN SCAN DIRECTION
231
220

WATER-BASED INK JET INK COMPOSITION

The present application is based on, and claims priority from JP Application Serial Number 2022-017717, filed Feb. 8, 2022, the disclosure of which is hereby incorporated by reference herein in its entirety.

BACKGROUND

1. Technical Field

The present disclosure relates to a water-based ink jet ink composition.

2. Related Art

Ink jet recording enables the recording of high-definition images with relatively simple equipment and is rapidly developing in different fields. Against this background, various studies have been conducted on characteristics such as light fastness and recovery from clogging. For example, JP-A-2003-176235 discloses a water-based ink containing a coloring agent, a dispersant for it, a humectant, a penetrant, and water with the aim of providing a color ink set advantageous in that, for example, it is satisfactory in color reproducibility, is highly transparent, and gives consistent-quality images good in water resistance and light fastness with little bleeding. The surface tension of the ink is in a predetermined range, and the coloring agent is at least one pigment selected from condensed azo pigments, nickel-complex azo pigments, condensed polycyclic pigments, and phthalocyanine pigments. The dispersant is an anionic surfactant containing an ethylene oxide group and/or a nonionic surfactant containing an ethylene oxide group.

Incidentally, research has been showing that ink compositions containing no dispersing resin and obtained by dispersing pigment(s) with surfactant(s) as in JP-A-2003-176235 tend to be inferior in the abrasion resistance of articles recorded therewith as a result of the exposure of the pigment(s) on the articles.

SUMMARY

According to an aspect of the present disclosure, an ink jet ink composition is a water-based ink jet ink composition containing Pigment Yellow 150; a dispersing resin; and N-hydroxyethylpyrrolidone.

BRIEF DESCRIPTION OF THE DRAWINGS

The FIG. 1s a diagram illustrating an example of a recording apparatus used in a recording method according to an embodiment.

DESCRIPTION OF EXEMPLARY EMBODIMENTS

Embodiments of an aspect of the present disclosure (hereinafter referred to as "embodiments") will now be described in detail, referring to the drawing as necessary. This aspect of the present disclosure, however, is not limited to these embodiments; various modifications can be made without departing from its gist. Like elements are referred to by like reference signs in the drawing, and each element is described only once. Relative positions, such as above and below and left and right, are based on the drawing unless stated otherwise. The relative dimensions of elements in the drawing are not necessarily drawn to scale.

1. Ink Jet Ink Composition

An ink jet ink composition according to an embodiment (hereinafter also referred to simply as "ink composition") is a water-based ink jet ink composition containing Pigment Yellow 150, a dispersing resin, and N-hydroxyethylpyrrolidone.

In the related art, surfactants are used to, for example, improve the wettability of ink compositions and improve the dispersion performance of colorants. Research, however, has been revealing that when an ink containing Pigment Yellow 150 as its colorant is made not with a dispersant but with a surfactant alone, the abrasion resistance of articles recorded with the ink is low, for example as a result of the exposure of the pigment on the surface of the ink coating. Making this ink with a dispersant gives rise to another disadvantage: the ink is inferior in recovery from clogging because once the ink composition dries, it does not easily dissolve again.

After extensive research to address this, the inventors found that making an ink composition containing Pigment Yellow 150, which is a yellow pigment, with a dispersing resin as a dispersant and N-hydroxyethylpyrrolidone (hereinafter also referred to as "HEP") as a solvent further improves the abrasion resistance of the ink coating and helps maintain recovery from clogging at the same time. This cannot be attributed to one particular reason, but a possible reason is that HEP has the ability to dissolve resins; the dissolved resin for dispersion covers the pigment, forming a smooth record surface that improves the abrasion resistance of the ink coating. The HEP, furthermore, improves recovery from clogging by encouraging the dissolution of the dispersing resin.

Possible ingredients for, characteristics of, and how to produce an ink composition according to this embodiment will now be described.

1.1. Colorants

The ink composition contains Pigment Yellow 150 as its colorant, optionally with other colorants. Pigment Yellow 150 may be the only colorant used, or two or more colorants may be used in combination.

1.1.1. Pigment Yellow 150

The ink composition according to this embodiment contains Pigment Yellow 150, which is a yellow pigment. Particularly effective in improving light fastness compared with other yellow pigments, Pigment Yellow 150 makes the ink composition according to this embodiment superior in light fastness. The Pigment Yellow 150 may be commercially available one or may be synthesized one.

Preferably, the Pigment Yellow 150 content is 1% by mass or more and 20% by mass or less, more preferably 2% by mass or more and 15% by mass or less, even more preferably 3% by mass or more and 10% by mass or less of the total amount of the ink composition. With a Pigment Yellow 150 content in these ranges, the light fastness of the ink composition tends to be even better.

1.1.2. Colorants Other Than Pigment Yellow 150

The ink composition may optionally contain colorants other than Pigment Yellow 150.

Any pigment other than Pigment Yellow 150 can be used, and examples include inorganic pigments and organic pigments. Examples of inorganic pigments that can be used include carbon black, iron oxide, and titanium dioxide. Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. The colorants can also be glitter pigments, such as metal particles, metal flakes, and inorganic salts.

The amount of colorants other than Pigment Yellow 150 in the ink composition is not critical. For example, the amount of such colorants is 0% by mass or more and 10% by mass or less, preferably 0% by mass or more and 8.0% by mass or less, more preferably 0.1% by mass or more and 7.0% by mass or less, even more preferably 0.3% by mass or more and 5.0% by mass or less of the total amount of the ink composition.

1.2. Dispersing Resin

In making the ink composition, the colorants, including Pigment Yellow 150, are dispersed using a resin as their dispersant. As used herein, the term dispersing resin refers to a resin used as a dispersant (i.e., a polymeric dispersant), and "an ink composition contains a dispersing resin" connotes that the ink composition is prepared with its colorant(s) dispersed in the resin, meaning in particular that Pigment Yellow 150, which is a pigment, has been dispersed with the use of the resin. The dispersing resin may be a random copolymer, a block copolymer, or a graft copolymer. One dispersing resin may be used alone, or two or more may be used in combination.

In this embodiment, the term dispersing resin refers to a compound that has a hydrophilic moiety and a hydrophobic moiety in its molecule with a group having an affinity for the colorants. Such a dispersing resin interacts with the surface of the colorants, potentially making their dispersion more stable. The term surfactant, on the other hand, is defined as a compound having a hydrophilic moiety and a hydrophobic moiety in its molecule without a group having an affinity for the colorants.

The acid value of the dispersing resin is, for example, 30 mg KOH/g or more and 100 mg KOH/g or less, preferably 35 mg KOH/g or more and 85 mg KOH/g or less, more preferably 40 mg KOH/g or more and 70 mg KOH/g or less, even more preferably 45 mg KOH/g or more and 60 mg KOH/g or less. With an acid value of the dispersing resin in these ranges, the recovery from clogging of the ink composition and/or the abrasion resistance of the ink coating tends to be further improved.

The acid value is calculated by applying measurements taken using Kyoto Electronics Manufacturing Co., Ltd.'s AT610 (product name) to equation (1) below. The measurements for the acid value can be taken by potentiometric colloidal titration of a solution of the polymer in tetrahydrofuran. The titration reagent used for this can be a solution of sodium hydroxide in ethanol.

$$\text{Acid value } (mg/g)=(EP1-BL1)\times FA1\times C1\times K1/\text{SIZE} \quad (1)$$

(where EP1 represents the titration volume (mL), BL1 represents the blank value (0.0 mL), FA1 represents the factor for the titrant (1.00), C1 represents an equivalent concentration (5.611 mg/mL) (equivalent to the amount of potassium hydroxide in 1 mL of 0.1 mol/L KOH), K1 represents a factor (1), and SIZE represents the amount of the sample (g))

The glass transition temperature ($T_g$) of the dispersing resin is, for example, −50° C. or above and 30° C. or below, preferably −40° C. or above and 20° C. or below, more preferably −30° C. or above and 10° C. or below, even more preferably −20° C. or above and 0° C. or below. With a glass transition temperature of the dispersing resin in these ranges, the recovery from clogging of the ink composition and/or the abrasion resistance of the ink coating tends to be further improved.

The glass transition temperature can be determined by known measuring methods. For example, it can be measured according to JIS K7121 (Testing Methods for Transition Temperatures of Plastics) using Hitachi High-Tech Science Corporation's differential scanning calorimeter "DSC7000."

The weight-average molecular weight of the dispersing resin is, for example, 50000 or more and 500000 or less, preferably 80000 or more and 400000 or less, more preferably 100000 or more and 300000 or less, even more preferably 150000 or more and 250000 or less. With a weight-average molecular weight of the dispersing resin in these ranges, the recovery from clogging of the ink composition and/or the abrasion resistance of the ink coating tends to be further improved.

The weight-average molecular weight can be measured by known methods. An example is chromatography.

Any kind of dispersing resin can be used, but examples include acrylic resins, urethane resins, polyester resins, polyamide resins, and polyimide resins. Of these, acrylic resins and urethane resins are particularly preferred. By using such a dispersing resin, abrasion resistance and recovery from clogging tend to be further improved.

An acrylic resin is a resin produced by polymerizing monomer(s) including at least an acrylate or acrylic acid. Acrylic resins produced by polymerizing at least one of an acrylate or acrylic acid with an extra monomer are preferred, and styrene acrylic resins, made with styrene as the extra monomer, are more preferred.

Such an acrylic resin can be of any kind, but examples include acrylic resins such as Joncryl 7100 and 390 (trade names, BASF), Mowinyl 952B and 718A (trade names, the Nippon Synthetic Chemical Industry), and Nipol LX872 and LX874 (trade names, Zeon) and styrene acrylic resins such as Mowinyl 966A and 975N (trade names, the Nippon Synthetic Chemical Industry). Preferably, the acrylic resin is Joncryl 7100; it enhances the abrasion resistance and/or recovery from clogging of the ink composition.

Urethan resin is a generic term for resins having a urethane bond. A urethane resin may be a polyol urethane resin, which contains, besides the polyurethane bond, a hydroxy group in its backbone; a polyester urethane resin, which contains an ester bond in its backbone; or a polycarbonate urethane resin, which contains a carbonate bond in its backbone. The urethane resin may be commercially available one or may be one produced by a known process.

The dispersing resin content is, for example, 3.0% by mass or more and 30% by mass or less, preferably 5.0% by mass or more and 20% by mass or less, more preferably 8.0% by mass or more and 15% by mass or less of the total amount of the ink composition. With a dispersing resin content in these ranges, the storage stability of the ink composition tends to be further improved.

1.3. Water-Soluble Organic Solvents

The ink composition according to this embodiment contains N-hydroxyethylpyrrolidone as a water-soluble organic solvent, optionally with non-HEP water-soluble organic solvents. One water-soluble organic solvent may be used alone, or two or more may be used in combination.

1.3.1. N-Hydroxyethylpyrrolidone

N-hydroxyethylpyrrolidone (HEP), the same compound as 1-(2-hydroxyethyl)-2-pyrrolidone, has the ability to dissolve dispersing resins. In the ink composition according to this aspect of the present disclosure, the dispersing resin contained therein can form rigid aggregates when the ink dries. The presence of HEP, however, allows the resin to be easily redispersed, and this helps improve recovery from clogging. Overall, the ink composition according to this aspect of the present disclosure allows the user to achieve good abrasion resistance combined with recovery from clogging with synergy between the dispersing resin and HEP.

The N-hydroxyethylpyrrolidone (HEP) content is, for example, 0.1% by mass or more and 20% by mass or less of the total amount of ink composition.

Preferably, the HEP content is 0.5% by mass or more, more preferably 1.08 by mass or more, even more preferably 1.5% by mass or more, still more preferably 2.0% by mass or more of the total amount of the ink composition. With a lower limit to its percentage in these ranges, the HEP tends to further improve the recovery from clogging of the ink composition by dissolving the resin to a sufficient extent.

Preferably, furthermore, the HEP content is 15% by mass or less, more preferably 12% by mass or less, even more preferably 10% by mass or less, still more preferably 9.0% by mass or less of the total amount of the ink composition. With an upper limit to the HEP content in these ranges, the storage stability of the ink composition tends to be further improved as a result of good bonding between the pigments and the dispersing resin.

Preferably, the ratio by mass of the N-hydroxyethylpyrrolidone (HEP) content to the dispersing resin content is 0.05 or greater and 1.2 or less. More preferably, this ratio by mass between content levels is 0.10 or greater and 1.0 or less, even more preferably 0.15 or greater and 0.90 or less. With a ratio by mass between content levels in these ranges, the abrasion resistance and/or recovery from clogging of the ink composition tends to be further improved.

1.3.2. Other Water-Soluble Organic Solvents

Any kind of water-soluble organic solvent can be used, and examples include glycerol; glycols, such as ethylene glycol, diethylene glycol, triethylene glycol, propylene glycol, dipropylene glycol, 1,3-propanediol, 1,2-butanediol, and 1,2-pentanediol; glycol monoethers, such as ethylene glycol monomethyl ether, ethylene glycol monoethyl ether, and triethylene glycol monobutyl ether; and alcohols, such as methanol, ethanol, n-propyl alcohol, isopropyl alcohol, n-butanol, 2-butanol, tert-butanol, isobutanol, and n-pentanol. One water-soluble organic solvent may be used alone, or two or more may be used in combination.

Of these, it is particularly preferred that the ink composition contain glycerol. Using glycerol as one of water-soluble organic solvents tends to improve recovery from clogging by limiting the evaporation of water from the ink composition.

The glycerol content is, for example, 1.0% by mass or more and 20% by mass or less of the total amount of the ink composition. Preferably, the glycerol content is 5.0% by mass or more and 15% by mass or less, more preferably 8.0% by mass or more and 12% by mass or less, of the total amount of the ink composition; this ensures the glycerol will produce its effect as described above.

The ink composition, furthermore, may contain a water-soluble organic solvent in the class of glycol monoethers. It would be preferred that such a solvent be triethylene glycol monobutyl ether (TEGmBE); TEGmBE would improve the moisture retention of the ink composition.

The water-soluble organic solvent content is not critical. For example, the water-soluble organic solvent content is 3.0% by mass or more and 50% by mass or less of the total amount of the ink composition. Preferably, the water-soluble organic solvent content is 10% by mass or more and 45% by mass or less, more preferably 15% by mass or more and 40% by mass or less, even more preferably 208 by mass or more and 35% by mass or less of the total amount of the ink composition; this further improves the recovery from clogging of the ink composition.

1.4. Resin Particles

Preferably, the ink composition contains resin particles. The presence of resin particles in the ink composition tends to further improve the abrasion resistance of the resulting ink coating because the particles help the ink composition fix firmly onto the recording medium. One kind of resin particles may be used alone, or two or more kinds may be used in combination.

Examples of resin particles include particles of resins such as urethane resins, acrylic resins (including styrene acrylic resins), fluorene resins, polyolefin resins, rosin-modified resins, terpene resins, polyester resins, polyamide resins, epoxy resins, and vinyl chloride resins. Of these, urethane resins are particularly preferred; particles of a urethane resin make the advantages of this aspect of the present disclosure even more significant and, at the same time, make it certain that such advantages will be produced. Particles of these resins are usually handled in emulsion form, but resin particles in powder form may also be used.

An example of a urethane resin is a urethane resin emulsion. Any kind of urethane resin emulsion can be used that is an emulsion of a resin having a urethane bond in its molecule, and examples include a polyether urethane resin, which contains an ether bond in its backbone; a polyester urethane resin, which contains an ester bond in its backbone; and a polycarbonate urethane resin, which contains a carbonate bond in its backbone. Of these, fine particles of a cationic or anionic urethane resin are particularly preferred.

Examples of commercially available urethane resin emulsions include Takelac W-6061, W-6020, W-635, W-605, W-635, and W-6021 (trade names of Mitsui Chemicals Polyurethanes' products), SUPERFLEX 870, 800, 150, 420, 460, 470, 610, and 700 (trade names of DKS's products), PERMARIN UA-150 (Sanyo Chemical Industries, Ltd.), Sancure 2710 (Lubrizol Japan), NeoRez R-9660, R-9637, and R-940 (Kusumoto Chemicals Ltd.), and ADEKA BONTIGHTER HUX-380 and 290K (ADEKA Corporation). Of these, it would be particularly preferred to use Takelac W-6061; it would boost the advantages of this aspect of the present disclosure.

An example of acrylic resin particles is an acrylic resin emulsion. Any kind of acrylic resin emulsion can be used, but examples include polymers of (meth)acrylic monomers, such as (meth)acrylic acid and (meth)acrylates, and copolymers of (meth)acrylic monomers with different monomers.

The resin particles content is not critical. For example, the resin particles content is 0% by mass or more and 10% by mass or less of the total amount of the ink composition on a solids basis. Preferably, the resin particles content is 0.5% by mass or more and 8.0% by mass or less, more preferably 1.0% by mass or more and 5.0% by mass or less, even more preferably 1.58 by mass or more and 3.0% by mass or less of the total amount of the ink composition; this boosts the advantages of this aspect of the present disclosure.

1.5. Surfactants

Any kind of surfactant can be used, but examples include acetylene glycol surfactants, fluorosurfactants, and silicone surfactants. Of these, acetylene glycol surfactants are particularly preferred. One surfactant may be used alone, or two or more may be used in combination.

An acetylene glycol surfactant can be of any kind, but an example of a preferred option is one or more selected from 2,4,7,9-tetramethyl-5-decin-4,7-diol and alkylene oxide adducts of 2,4,7,9-tetramethyl-5-decin-4,7-diol and 2,4-dimethyl-5-decin-4-ol and alkylene oxide adducts of 2,4-dimethyl-5-decin-4-ol.

As for commercially available acetylene glycol surfactants, any such surfactant can be used, but examples include OLFINE 104 surfactants and OLFINE E surfactants, such as E1010 (trade names, Air Products), and Surfynol 465 and Surfynol 61 (trade names, Nissin Chemical Industry). Of these, OLFINE E1010 is particularly preferred; it makes the advantages of this aspect of the present disclosure even more significant and, at the same time, makes it certain that such advantages will be produced.

Preferably, the surfactant content of the ink composition is 0.1% by mass or more and 5.0% by mass or less, more preferably 0.2% by mass or more and 4.0% by mass or less, even more preferably 0.5% by mass or more and 3.0% by mass or less of the total amount of the ink composition. With a surfactant content in these ranges, the storage stability of the ink composition tends to be improved.

1.6. Water

The ink composition according to this embodiment is a water-based ink composition, which contains water. A water-based ink composition is an ink composition that contains at least water as a major solvent component of the ink.

Preferably, the water content is 30% by mass or more of the total amount of the ink. Preferably, furthermore, the water content is 98% by mass or less, more preferably 90% by mass or less, even more preferably 40% by mass or more and 80% by mass or less, still more preferably 45% by mass or more and 70% by mass or less. With a water content equal to or greater than these ranges, the storage stability of the ink composition tends to be further improved. With a water content of 90% by mass or less, furthermore, the curling of articles recorded with the ink composition tends to be further reduced.

1.7. Extra Ingredients

The ink composition according to this embodiment may contain ingredients other than those described above. Examples of such ingredients include a pH-adjusting agent, a humectant, and a chelating agent.

The presence of each of such ingredients in the ink composition can be confirmed by various known methods. Examples of such methods include NMR spectrometry, HPLC-MS and other mass spectrometric analyses, and IR spectrometry.

1.8. How to Produce the Ink Jet Ink Composition

It is not critical how the ink jet ink composition according to this embodiment is produced. A possible method is one in which pigments including Pigment Yellow 150 are dispersed in a resin, the composition of the pigment dispersion is customized to contain N-hydroxyethylpyrrolidone, and the ingredients are mixed together. The dispersion of the pigments in a resin can be done by known methods.

2. Ink Jet Recording Method

An ink jet method according to an embodiment includes an ejection step, in which the above ink jet ink composition is ejected and attached to a recording medium using a predetermined ink jet head; and a transport step, in which the recording medium is transported. The ejection and transport steps may be carried out simultaneously or may be carried out alternately.

2.1. Ejection Step

In the ejection step, ink is ejected from an ink jet head and attached to a recording medium. More specifically, a pressure generator installed in an ink jet head is actuated, and this causes ink stored in a pressure chamber of the ink jet head to be ejected through nozzles. Such an ejection method is also referred to as ink jet ejection.

Examples of ink jet heads used in the ejection step include a line head, which performs line recording, and a serial head, which performs serial recording.

In an exemplary process of line recording, in which a line head is used, an ink jet head having a width equal to or greater than the recordable width of the recording medium is fixed on the recording apparatus. By moving the recording medium in the sub-scan direction (direction of transport of the recording medium) and ejecting ink droplets through nozzles of the ink jet head in tandem with this movement, an image is recorded on the recording medium.

In an exemplary process of serial recording, in which a serial head is used, the ink jet head is mounted on a carriage configured to move along the width of the recording medium. By moving the carriage in the main scan direction (along the width of the recording medium) and ejecting ink droplets through nozzles of the ink jet head in tandem with this movement, an image is recorded on the recording medium.

2.2. Transport Step

In the transport step, the recording medium is transported in a predetermined direction inside the recording apparatus. More specifically, the recording medium is transported from the medium feeding section to the medium output section of the recording apparatus using transport rollers or a transport belt installed in the recording apparatus. During that process of transport, ink ejected from the ink jet head adheres to the recording medium, forming a record. The transport job may be done continuously or may be done intermittently.

2.3. Recording Medium

The recording medium used in this embodiment can be of any kind, but an example is an absorbent or nonabsorbent recording medium.

An absorbent recording medium can be of any kind, but examples range from ordinary printing paper with high permeability to ink, such as electrophotographic paper, and ink jet paper (dedicated paper for ink jet recording, which has an ink-absorbing layer formed by silica or alumina particles or an ink-absorbing layer formed by a hydrophilic polymer, such as polyvinyl alcohol (PVA) or polyvinyl pyrrolidone (PVP)) to paper that has relatively low permeability to ink and is used in general offset printing, such as art paper, coated paper, and cast-coated paper.

A nonabsorbent recording medium can be of any kind, but examples include a plastic film or plate, for example of polyvinyl chloride, polyethylene, polypropylene, polyethylene terephthalate (PET), polycarbonate, polystyrene, or polyurethane; a plate of a metal, for example of iron, silver, copper, or aluminum; a deposited layer of such a metal on a metal plate, plastic film, or plate of an alloy, for example of stainless steel or brass; and a recording medium formed by a paper substrate and a plastic film, for example of polyvinyl chloride, polyethylene, polypropylene, polyethylene terephthalate (PET), polycarbonate, polystyrene, or polyurethane, bonded thereto (coated thereonto).

3. Recording Apparatus

The FIGURE illustrates a perspective view of a serial printer as an example of an ink jet apparatus. As illustrated in the FIGURE, the serial printer 20 includes a transport section 220 and a recording section 230. The transport section 220 transports a recording medium F fed to the serial printer to the recording section 230 and, after a recording job, outputs the recording medium from the serial printer.

Specifically, the transport section 220 has feeding rollers and transports the fed recording medium F in the sub-scan direction T1 therewith.

The recording section 230, furthermore, includes a carriage 234 holding an ink jet head 231 and also includes a carriage-moving mechanism 235 that moves the carriage 234 in the main scan direction S1-S2 in relation to the recording medium F. The ink jet head 231 has sets of nozzles for ejecting an ink composition and a treatment liquid toward the recording medium F fed from the transport section 220.

A serial printer has a head whose length is shorter than the width of the recording medium as its ink jet head 231. The head moves, and a recording job is carried out with multiple passes (multipass recording). A serial printer, furthermore, has its head 231 on a carriage 234 that moves in a predetermined direction, and the head ejects an ink composition and a treatment liquid onto the recording medium by moving as the carriage moves. Through this, a recording job is carried out with two or more passes (multipass recording). A pass is also referred to as a main scan. Between a pass and another, a sub-scan, which is the transport of the recording medium, is performed. That is, a main scan and a sub-scan are done alternately.

The ink jet apparatus according to this embodiment, furthermore, does not need to be such a serial-recording printer; it may be a printer for line recording as described above. A line-recording printer is a printer that carries out a recording job on a recording medium with one scan using a line head, an ink jet head having a length equal to or greater than the recordable width of the recording medium.

EXAMPLES

An aspect of the present disclosure will now be described more specifically using examples and comparative examples. No aspect of the present disclosure is limited by these examples.

1. Preparation of Ink Compositions

Ingredients were put into a mixture tank according to the composition specified in Table 1, mixed and stirred together, and the resulting mixture was filtered through a membrane filter to give the ink jet ink composition of each example or comparative example. More specifically, in Examples 1 to 7 and Comparative Examples 1 and 3 in Table 1, a liquid dispersion was prepared by dispersion with a dispersing resin, and the ingredients were mixed together according to the composition in Table 1. In Comparative Example 2, the dispersing method was with an anionic surfactant. The numbers given to the ingredients in each example or comparative example in the table represent % by mass unless stated otherwise, and the total amount of all ingredients including water is 100. In the table, furthermore, the numbers for the pigments, resin particles, and pH-adjusting agent represent % by mass on a solids basis.

The abbreviations used and the details of the products/ingredients listed in Table 1 are as follows.

Pigments

Pigment Yellow 150

Pigment Yellow 138

Dispersing Resins

An acrylic resin (trade name "Joncryl 7100," BASF)

A urethane resin (see Synthesis Example 1) Solvents (water-soluble organic solvents)

HEP (N-hydroxyethylpyrrolidone)

Glycerol (commercially available one)

TEGmBE (triethylene glycol monobutyl ether)

Surfactant

OLFINE E1010 (trade name, an acetylene glycol surfactant, Air Products)

Resin Particles

Takelac W6061 (trade name, a urethane resin, Mitsui Takeda Chemicals, Inc.)

Anionic Surfactant

The diethanolamine salt of $C_{13}H_{27}O\ (CH_2CH_2O)_{27}PO(OH)_2$

Synthesis Example 1

A urethane resin for use as a dispersing resin was synthesized through the following procedure.

A 50.3% by mass sample of polytetramethylene glycol was added to methyl ethyl ketone and dissolved by thorough stirring. Then 33.5% by mass isophorone diisocyanate and 14.3% by mass dimethylolpropionic acid were added, and the resulting mixture was allowed to react at 75° C. for 1 hour to give a solution containing a prepolymer. The resulting solution was cooled to 60° C., and carboxy groups of the prepolymer were neutralized by adding an aqueous solution of potassium hydroxide. Then, after the solution was cooled to 40° C., the prepolymer was emulsified by rapidly stirring the solution with deionized water in a homogenizing mixer. After that, 1.9% by mass neopentyl glycol (chain extender) was added, and the chain extension of the prepolymer was carried out at 30° C. over 12 hours. When isocyanate groups were no longer found, methyl ethyl ketone was removed from the solution under heat and reduced pressure. In this way, a urethane resin was obtained.

2. Evaluation Methods 2.1. Abrasion Resistance

An ink cartridge of Seiko Epson's printer PX-M860F was loaded with the ink, and a character pattern was printed on a recording medium in an environment at a temperature of 25° C. and a relative humidity of 50%. The recording medium was A4-sized (210 mm×297 mm) copier paper "Xerox P paper" (Fuji Xerox Co., Ltd.; grammage, 64 g/m$^2$; paper thickness, 88 μm).

Grading Criteria

AA: No bleeding in a rubbed area

A: Bleeding is observed in the rubbed area but is unnoticeable

B: Bleeding is observed in the rubbed area but is substantially unnoticeable

C: Bleeding is observed in the rubbed area and is noticeable 2.2. Recovery from Clogging An ink cartridge of the printer PX-M860F was loaded with the ink, and a print job was carried out. The print parameters were set so that there would be clogged nozzles, and the printer was unplugged during the print job. In this state of the head off its cap, the printer was left in an environment at 40° C. for 7 days. After that, the number of cleaning jobs required for all nozzles to recover was measured, and recovery from clogging was graded according to the criteria below.

Grading Criteria

AA: The number of cleaning jobs is fewer than two

A: The number of cleaning jobs is two or more and fewer than four

B: The number of cleaning jobs is four or more and fewer than six

C: The number of cleaning jobs is six or more 2.3. Light Fastness

An ink cartridge of the printer PX-M860F was loaded with the ink, and a print job was carried out. Using EPSON Premium Glossy Photo Paper (trade name; model number, "KA4100PSKR"; Seiko Epson Corporation), a recorded article with a 100% duty solid pattern image was obtained. The resulting recorded article was left in a dark place at room temperature for 1 day. After that, the recorded article was set on xenon weather meter XL-75s (trade name, Suga Test Instruments Co., Ltd.), and a 30-day exposure test was performed under the conditions of 23° C., a relative humidity of 50% RH, and an illuminance of 75000 lux. The OD before the exposure (DO) and that after the exposure (D) of the image on the recorded article were measured using spectrophotometer i1 (trade name, X-rite), the relict optical density (ROD) was determined according to the equation below, and light fastness was graded according to the grading criteria below.

$$ROD\ (\%) = (D/DO) \times 100$$

As used herein, "duty" is a value calculated according to the equation below.

$$\text{Duty}\ (\%) = \text{The number of dots actually printed}/(\text{Vertical resolution} \times \text{Horizontal resolution}) \times 100$$

(where "the number of dots actually printed" is the number of dots actually printed per unit area, and "vertical resolution" and "horizontal resolution" are resolutions per unit area. The term "100% duty" means printing a color of ink to its maximum possible weight per unit pixel.) Grading Criteria A: The ROD is 70% or more C: The ROD is less than 70%

2.4. Ink Storage Stability

The viscosity of the freshly prepared ink composition and that of the ink composition left at 70° C. for 6 days were measured using rheometer MCR-300 (trade name, Physica), and the percentage change (%) was determined.

Grading Criteria

A: The percentage change in viscosity is less than 5%

B: The percentage change in viscosity is 5% or more and less than 10%

C: The percentage change in viscosity is 10% or more

TABLE 1

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| Pigments | Pigment Yellow 150 | 5 | 5 | 5 | 5 | 5 | 5 | 5 | 5 | — | — | 5 |
| | Pigment Yellow 138 | — | — | — | — | — | — | — | — | 5 | 5 | — |
| Dispersing resins | Acrylic resin | 10 | 10 | 10 | 10 | 10 | 10 | — | 10 | — | 10 | — |
| | Urethane resin | — | — | — | — | — | — | 10 | — | — | — | — |
| Solvents | HEP | 3.5 | 1.5 | 9 | 0.5 | 12 | 1.5 | 3 | 0 | 3 | 3 | 3 |
| | Glycerol | 10 | 10 | 10 | 10 | 10 | 10 | 10 | 13 | 10 | 10 | 10 |
| | TEGmBE | 10 | 10 | 10 | 10 | 10 | 10 | 10 | 10 | 10 | 10 | 10 |
| Surfactant | OLFINE E1010 | 1 | 1 | 1 | 1 | 1 | 1 | 1 | 1 | 1 | 1 | 1 |
| Resin particles | Takelac W6061 | — | — | — | — | — | 2 | — | — | — | — | — |
| Anionic surfactant | | — | — | — | — | — | — | — | — | 1.25 | — | 1.25 |
| | Water | Balance | Balance | Balance | Balance | Balance | Balance | Balance | Balance | Balance | Balance | Balance |
| Evaluation items | Abrasion resistance | AA | A | A | B | A | AA | A | B | C | A | C |
| | Recovery from clogging | AA | B | A | B | B | B | A | C | A | A | A |
| | Light fastness | A | A | A | A | A | A | A | A | C | C | A |
| | Storage stability | A | A | B | A | B | A | A | A | A | A | A |

3. Evaluation Results

Table 1 presents the composition of the ink used and the evaluation results in each example or comparative example. Table 1 indicates that making a water-based ink jet ink composition with Pigment Yellow 150, a dispersing resin, and N-hydroxyethylpyrrolidone makes the ink composition superior in recovery from clogging and, at the same time, makes an article recorded with the ink composition superior in abrasion resistance and light fastness.

In particular, Comparative Example 1 demonstrates that omitting N-hydroxyethylpyrrolidone affects recovery from clogging and abrasion resistance. Comparative Example 2, furthermore, shows pigment dispersion with a surfactant affects abrasion resistance, and Comparative Example 3 indicates the absence of Pigment Yellow 150 tends to affect light fastness.

What is claimed is:

1. A water-based ink jet ink composition comprising:

Pigment Yellow 150;

a dispersing resin having a weight-average molecular weight of 150000 or more and 500000 or less; and N-hydroxyethylpyrrolidone, wherein a ratio by mass of an N-hydroxyethylpyrrolidone content to a dispersing resin content is 0.05 or greater and 1.2 or less.

2. The water-based ink jet ink composition according to claim 1, wherein:

an N-hydroxyethylpyrrolidone content is 1% by mass or more of a total amount of the ink composition.

3. The water-based ink jet ink composition according to claim 1, wherein:

an N-hydroxyethylpyrrolidone content is 1% by mass or more and 10% by mass or less of a total amount of the ink composition.

4. The water-based ink jet ink composition according to claim 1, further comprising resin particles.

5. The water-based ink jet ink composition according to claim 1, further comprising glycerol.

* * * * *